(12) United States Patent
Abramowitz (10) Patent No.: US 12,457,205 B2
(45) Date of Patent: Oct. 28, 2025

(54) SYSTEM AND METHOD FOR BLOCK CHAIN ENCRYPTED COMMUNICATION AND IDENTIFICATION

(71) Applicant: Marc Lauren Abramowitz, Palo Alto, CA (US)

(72) Inventor: Marc Lauren Abramowitz, Palo Alto, CA (US)

(73) Assignee: Marc Lauren Abramowitz, Aspen, CO (US)

( * ) Notice: Subject to any disclaimer, the term of this patent is extended or adjusted under 35 U.S.C. 154(b) by 131 days.

(21) Appl. No.: 16/195,985

(22) Filed: Nov. 20, 2018

(65) Prior Publication Data

US 2019/0199700 A1    Jun. 27, 2019

Related U.S. Application Data

(60) Provisional application No. 62/588,710, filed on Nov. 20, 2017.

(51) Int. Cl.
| | | |
|---|---|---|
| H04L 9/06 | (2006.01) | |
| H04L 9/00 | (2022.01) | |
| H04L 9/32 | (2006.01) | |
| H04L 9/40 | (2022.01) | |

(52) U.S. Cl.
CPC .............. *H04L 63/08* (2013.01); *H04L 9/006* (2013.01); *H04L 9/0618* (2013.01); *H04L 9/0643* (2013.01); *H04L 9/3239* (2013.01); *H04L 9/50* (2022.05)

(58) Field of Classification Search
CPC ..... H04L 63/08; H04L 9/0618; H04L 9/0643; H04L 2209/38; H04L 9/006; H04L 9/3239; H04L 9/50; H04L 63/0428
USPC .......................................................... 713/155
See application file for complete search history.

(56) References Cited

U.S. PATENT DOCUMENTS

| | | | | |
|---|---|---|---|---|
| 8,402,559 | B2 * | 3/2013 | Baum ................ | H04L 61/5014 |
| | | | | 726/2 |
| 8,914,005 | B2 * | 12/2014 | Wu ...................... | H04W 60/06 |
| | | | | 455/435.1 |
| 9,432,939 | B2 * | 8/2016 | Sugitani ............. | H04W 56/001 |
| 9,584,493 | B1 * | 2/2017 | Leavy ................. | H04L 63/104 |
| 9,769,592 | B2 * | 9/2017 | Buckley .............. | H04W 8/005 |
| 9,836,790 | B2 * | 12/2017 | Ronca ................. | G06Q 40/04 |
| 9,967,333 | B2 * | 5/2018 | Chen ................... | H04L 63/10 |
| 9,967,334 | B2 * | 5/2018 | Ford .................... | H04L 41/0806 |
| 10,122,661 | B2 * | 11/2018 | Golan ................. | G06F 16/2379 |
| 10,305,833 | B1 * | 5/2019 | Dennis ................ | H04L 9/16 |
| 10,339,523 | B2 * | 7/2019 | McDonough ........ | G06Q 20/308 |
| 10,367,905 | B2 * | 7/2019 | Kouru ................. | H04L 67/60 |
| 10,693,658 | B2 * | 6/2020 | Jacobs ................ | H04W 12/106 |
| 10,745,943 | B1 * | 8/2020 | Jonak .................. | E05B 67/02 |
| 10,909,510 | B1 * | 2/2021 | Kurani ................ | G06Q 20/065 |
| 10,938,567 | B2 * | 3/2021 | Martino .............. | G06Q 20/065 |
| 10,972,287 | B2 * | 4/2021 | Thekadath .......... | G16H 10/60 |

(Continued)

*Primary Examiner* — Khalid M Almaghayreh
(74) *Attorney, Agent, or Firm* — Saul Ewing LLP (57) ABSTRACT

A data structure is disclosed that maintains a continuously growing list of records, or blocks, in a blockchain format. The data structure may be distributed using peer-to-peer and cryptographic techniques. The data of each record is resistant to modification in that once recorded the data may not be altered retroactively. The data structure serves as a public ledger for all transactions and may be managed autonomously.

7 Claims, 7 Drawing Sheets

(56) References Cited

U.S. PATENT DOCUMENTS

| | | | | |
|---|---|---|---|---|
| 10,991,242 | B2* | 4/2021 | Taylor | H04Q 9/00 |
| 11,017,122 | B2* | 5/2021 | Uhr | G06F 16/137 |
| 11,080,665 | B1* | 8/2021 | Poelstra | H04L 9/3013 |
| 11,165,589 | B2* | 11/2021 | Jackson | G06Q 20/3829 |
| 11,182,781 | B2* | 11/2021 | Castinado | H04L 9/321 |
| 11,188,918 | B1* | 11/2021 | Kurani | G06Q 20/202 |
| 11,429,960 | B2* | 8/2022 | Fallah | H04L 61/103 |
| 11,551,195 | B2* | 1/2023 | Anbukkarasu | G06Q 20/308 |
| 11,704,733 | B2* | 7/2023 | Wilkins | H04L 9/14 |
| | | | | 705/71 |
| 2007/0218926 | A1* | 9/2007 | Zhuang | H04W 60/04 |
| | | | | 455/466 |
| 2014/0156369 | A1* | 6/2014 | Circe | G06Q 30/0217 |
| | | | | 705/14.19 |
| 2014/0328219 | A1* | 11/2014 | Forbes | H04M 3/436 |
| | | | | 370/259 |
| 2015/0363770 | A1* | 12/2015 | Ronca | G06Q 20/382 |
| | | | | 705/64 |
| 2016/0259937 | A1* | 9/2016 | Ford | G06F 21/57 |
| 2016/0261404 | A1* | 9/2016 | Ford | H04L 67/104 |
| 2016/0261685 | A1* | 9/2016 | Chen | H04W 12/0023 |
| 2016/0283941 | A1* | 9/2016 | Andrade | G06Q 20/3829 |
| 2017/0085555 | A1* | 3/2017 | Bisikalo | G06F 3/0619 |
| 2017/0118301 | A1* | 4/2017 | Kouru | H04L 67/06 |
| 2017/0132626 | A1* | 5/2017 | Kennedy | G06Q 20/065 |
| 2017/0236120 | A1* | 8/2017 | Herlihy | G06Q 20/065 |
| | | | | 705/67 |
| 2017/0346833 | A1* | 11/2017 | Zhang | H04L 9/3218 |
| 2017/0364936 | A1* | 12/2017 | Balfour | G06Q 20/204 |
| 2018/0054491 | A1* | 2/2018 | Mankovskii | H04L 67/142 |
| 2018/0075028 | A1* | 3/2018 | Ruschin | G06Q 10/00 |
| 2018/0097635 | A1* | 4/2018 | Moses | H04L 9/3236 |
| 2018/0101684 | A1* | 4/2018 | Murphy | G06F 21/602 |
| 2018/0108024 | A1* | 4/2018 | Greco | H04W 4/029 |
| 2018/0144342 | A1* | 5/2018 | Borandi | G06Q 20/00 |
| 2018/0158051 | A1* | 6/2018 | Arora | G06Q 20/20 |
| 2018/0167394 | A1* | 6/2018 | High | H04L 63/123 |
| 2018/0174122 | A1* | 6/2018 | Mattingly | G06Q 20/202 |
| 2018/0191503 | A1* | 7/2018 | Alwar | H04L 9/14 |
| 2018/0240107 | A1* | 8/2018 | Andrade | G06Q 20/36 |
| 2018/0285879 | A1* | 10/2018 | Gadnis | G06Q 20/3674 |
| 2018/0314809 | A1* | 11/2018 | Mintz | H04L 9/3236 |
| 2019/0012695 | A1* | 1/2019 | Bishnoi | G06Q 20/223 |
| 2019/0058593 | A1* | 2/2019 | Polcha | H04L 9/3239 |
| 2019/0081918 | A1* | 3/2019 | Kamrani | H04L 51/212 |
| 2019/0114584 | A1* | 4/2019 | Toohey | G06Q 10/0833 |
| 2019/0122161 | A1* | 4/2019 | Cicio, Jr. | G06Q 10/063112 |
| 2019/0122241 | A1* | 4/2019 | Brunet | G06Q 30/0201 |
| 2019/0130416 | A1* | 5/2019 | Boudville | G06Q 20/1085 |
| 2019/0205898 | A1* | 7/2019 | Greco | G06Q 20/3829 |
| 2019/0253258 | A1* | 8/2019 | Thekadath | G06Q 20/02 |
| 2019/0281259 | A1* | 9/2019 | Palazzolo | H04L 9/0643 |
| 2019/0319808 | A1* | 10/2019 | Fallah | H04L 9/3239 |
| 2019/0332809 | A1* | 10/2019 | Uhr | G06Q 20/223 |
| 2020/0076798 | A1* | 3/2020 | Lidsky | H04L 9/3228 |
| 2020/0211011 | A1* | 7/2020 | Anderson | G06Q 20/3674 |
| 2020/0219169 | A1* | 7/2020 | Lahijani | G06Q 30/0205 |
| 2020/0252780 | A1* | 8/2020 | McClendon, IV | H04W 4/90 |
| 2021/0035092 | A1* | 2/2021 | Pierce | G06Q 20/02 |
| 2021/0194701 | A1* | 6/2021 | Thekadath | G06Q 20/02 |
| 2021/0266167 | A1* | 8/2021 | Lohe | G06Q 20/10 |
| 2022/0210266 | A1* | 6/2022 | Kats | H04M 19/041 |
| 2022/0405750 | A1* | 12/2022 | Fallah | H04L 9/14 |
| 2023/0137650 | A1* | 5/2023 | DiMaria | H04M 3/5231 |
| | | | | 379/209.01 |
| 2023/0274240 | A1* | 8/2023 | Clark | G06Q 20/3274 |
| | | | | 705/75 |
| 2023/0306513 | A1* | 9/2023 | Wilkins | H04L 9/3236 |

\* cited by examiner

SYSTEM AND METHOD FOR BLOCK CHAIN ENCRYPTED COMMUNICATION AND IDENTIFICATION

PRIORITY

This application claims the benefit of U.S. Provisional 62/588,710, which is hereby incorporated by reference.

FIELD OF THE INVENTION

The present invention relates to a decentralized data structure, and, more particularly, a data structure that maintains a continuously growing list of records, or blocks, in a blockchain format.

BACKGROUND

A cryptographic currency is a digital medium of exchange that enables distributed, rapid, cryptographically secure, confirmed transactions for goods and/or services. One of the first cryptographic currencies was Bitcoin, which is based on a peer-to-peer network, in 2009. Since then, numerous cryptographic currencies have become available. Fundamentally, cryptographic currencies are specifications regarding the use of currency that seek to incorporate principles of cryptography (e.g., public-key cryptography) to implement a distributed and decentralized information economy. A digital currency, e.g., a bitcoin used in Bitcoin, is computationally brought into existence by an issuer (e.g., a bitcoin is "mined").

BRIEF SUMMARY OF THE INVENTION

The present invention provides method of secure communications, comprising writing into a block associated with a distributed ledger at least one sequence of characters representative of a message, the distributed ledger having at least one second block, further comprising at least one credential, sending the distributed ledger to a communication device through at least one network, authenticating, by one of the plurality of network nodes resident on the at least one network, the at least one credential, writing into the distributed ledger at least one indication indicative of the authenticating and displaying the message and the at least one indication on the communication device It shall be noted that using the block chain to communicate information and messages has several benefits. First, messages can be sent to a device, from a device, or both. Second, it does not rely on a centralized authority. Third, once a message is added to the block chain, it cannot be altered or removed. Fourth, it is decentralized so it is difficult, if not impossible, to block access to it.

BRIEF DESCRIPTION OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

The detailed description makes reference to the accompanying figures in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that exemplary embodiments may be embodied in different forms. As such, the exemplary embodiments should not be construed to limit the scope of the disclosure. As referenced above, in some exemplary embodiments, well-known processes, well-known device structures, and well-known technologies may not be described in detail.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "messages," "blocks," and "data," shall be understood to mean a group of bits, which may be transported across a network. These terms shall not be interpreted as limiting embodiments of the present invention to particular configuration; and, these terms along with similar terms such as "data," "data traffic," "information," "cell," etc. may be replaced by other terminologies referring to a group a bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

The terminology used herein is for the purpose of describing particular exemplary embodiments only and is not intended to be limiting. For example, as used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on," "engaged to," "connected to," or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer, or section without departing from the teachings of the exemplary embodiments.

A computer-implemented platform and methods of use are disclosed that provide networked access to a plurality of types of digital content, including but not limited to video, audio, and document content, and that track and deliver the accessed content, such as via one or more applications, or "apps." Described embodiments are intended to be exemplary and not limiting. As such, it is contemplated that the herein described systems and methods can be adapted to provide many types of users with access and delivery of many types of domain data, and can be extended to provide enhancements and/or additions to the exemplary services described. The invention is intended to include all such extensions. Reference will now be made in detail to various exemplary and illustrative embodiments of the present invention.

Figure 1:
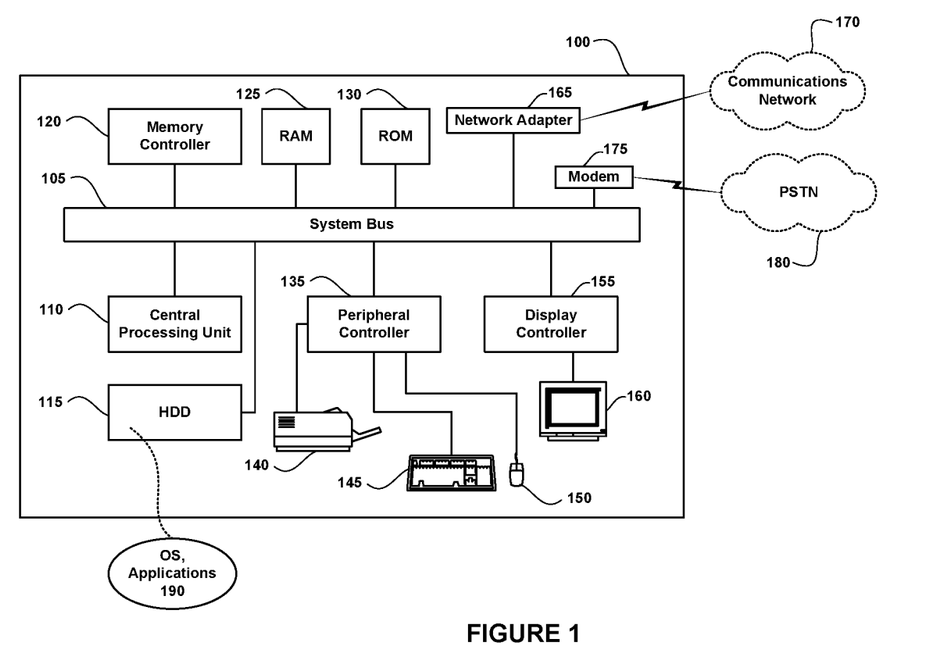
FIG. 1 is a block diagram of an exemplary computing system for use in accordance with herein described systems and methods.

FIG. 1 depicts an exemplary computing system 100 that can be used in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, mobile devices, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output generated by computing system 100. Such visual output may include text, graphics, animated graphics, and/or video, for example. Display 160 may be implemented with a CRT-based video display, an LCD-based display, gas plasma-based display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet, and hence which may provide or include tracking of and access to the domain data discussed herein. Communications network 170 may provide user access to computing system 100 with means of communicating and transferring software and information electronically, and may be coupled directly to computing system 100, or indirectly to computing system 100, such as via PSTN or cellular network 180. For example, users may communicate with computing system 100 using communication means such as email, direct data connection, virtual private network (VPN), Skype or other online video conferencing services, or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
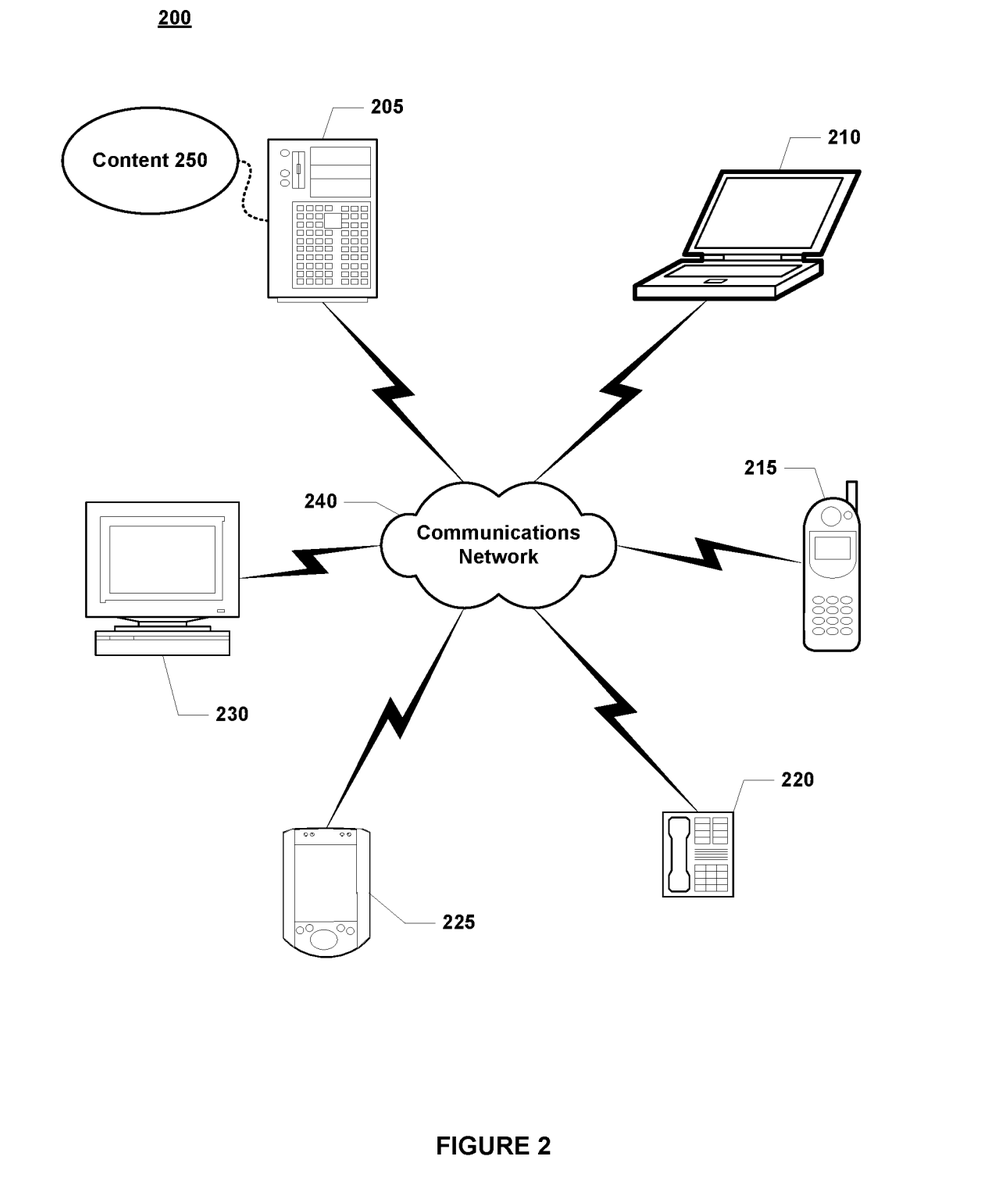
FIG. 2 is a block diagram showing an exemplary networked computing environment for use in accordance with herein described systems and methods.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or independently developed applications, the like, to interact with server 205.

The server 205 may thus deliver applications specifically designed for mobile client devices, such as, for example, client device 225. A client device 225 may be any mobile telephone, PDA, tablet or smart phone and may have any device compatible operating system. Such operating systems may include, for example, Symbian, RIM Blackberry OS, Android, Apple iOS, Windows Phone, Palm webOS, Maemo, bada, MeeGo, Brew OS, and Linux for smartphones and tablets. Although many mobile operating systems may be programmed in C++, some may be programmed in Java and .NET, for example. Some operating systems may or may not allow for the use of a proxy server and some may or may not have on-device encryption. Of course, because many of the aforementioned operating systems are proprietary, in prior art embodiments server 205 delivered to client device 225 only those applications and that content applicable to the operating system and platform communication relevant to that client device 225 type.

JavaScript Serialized Object Notation (JSON), a lightweight, text-based, language-independent data-interchange format, is based on a subset of the JavaScript Programming Language, Standard ECMA-262, 3.sup.rd Edition, dated December 1999. JSON syntax is a text format defined with a collection of name/value pairs and an ordered list of values. JSON is very useful for sending structured data over wire (e.g., the Internet) that is lightweight and easy to parse. It is language and platform independent, but uses conventions that are familiar to C-family programming conventions. The JSON language is thus compatible with a great many operating systems (a list of such systems is available at www.json.org).

The techniques described herein may be used for various wireless communication networks, such as CDMA, TDMA, FDMA, OFDMA, SCFDMA, and other wireless networks. The terms "network" and "system" are often used interchangeably herein. By way of example, a CDMA network may implement a radio technology such as Universal Terrestrial Radio Access (UTRA), cdma2000, and the like. For example, an OFDMA network may implement a radio technology such as Evolved UTRA (E-UTRA), Ultra Mobile Broadband (UMB), IEEE 8011 IEEE 802.16 (WiMAX), IEEE 802.20, Flash-OFDMO, and the like. UTRA and E-UTRA are part of Universal Mobile Telecommunication System (UMTS). UTRA, E-UTRA, UMTS, as well as long term evolution (LTE) and other cellular techniques, are described in documents from an organization named "3rd Generation Partnership Project" (3GPP) and "3rd Generation Partnership Project 2" (3GPP2), such as, for example, the mobile standards for 5G which will begin in the 3GPP Release 15.

"WiFi" stands for "Wireless Fidelity." WiFi is typically deployed as a wireless local area network (WLAN) that may extend home and business networks to wireless medium. As referenced, the IEEE 802.11 standard defines WiFi communications as between devices, and as between devices and access points. WiFi typically provides aggregate user data speeds from 2 Mbps (for 802.11b) to approximately 150 Mbps (for 802.11n). Typical speeds for WiFi are around 15 Mbps, and latency (i.e., packet delay) averages around 10 ms with no load WiFi may link devices, and/or devices and access points, over distances from a few feet to several miles. By way of contrast, LTE, as mentioned above, typically provides WAN connectivity that may stretch for much greater distances, but is typically not preferred for LAN communications. Of note, the techniques described herein may be used for the wireless networks and radio technologies mentioned above, as well as for other wireless networks and radio technologies.

WiFi networks, herein also referred to as IEEE 802.11 wireless networks, may operate in two modes: infrastructure mode and ad-hoc mode. In infrastructure mode, a device connects to an access point (AP) that serves as a hub for connecting wireless devices to the network infrastructure, including, for example, connecting wireless devices to Internet access. Infrastructure mode thus uses a client-server architecture to provide connectivity to the other wireless devices. In contrast to the client-server architecture of infrastructure mode, in ad-hoc mode wireless devices have direct connections to each other in a peer-to-peer architecture.

In various embodiments, a blockchain, or distributed ledger, provides a decentralized approach to tracking information. By eliminating the need for a central authority, information and transactions therewith may be circulated and verified over a network. A blockchain may provide a secure solution for tracking, for example, the ownership and transfer of assets. In a simplified example, a blockchain may provide proof of who owns what at any given point in time and be replicated on hundreds or thousands of computing nodes.

Blockchain structure offers solutions to the dilemma of balancing data, identity, and transaction-based privacy and security. By way of example, security and privacy breaches have occurred, and may continue to happen, within large, often centrally organized entities, such as, for example, big box store retailers, social networks, closed networks, governments and militaries. For consumer facing entities, the privacy and security of customer information, payment information, and transaction histories may be paramount to the success of the business. For closed networks, governments and military networks, the security of data is often directly related to the safety and security of a group of people.

As described herein, blockchain and the related decentralized applications based on blockchain may provide solutions to data security, for example, when using cryptographically-secured encryption as a part of the blockchain used in the particular applications, especially as related to the data parts. Although current systems and networks encrypt data, the decentralizing of various aspects of an information architecture may allow for unintended breaches in currently employed encryption chains and layers as, for example, individual users manipulate and interact with their own data. Using blockchain to hold data, authentication information, and encryption aspects, user data and central repositories may be less vulnerable to data losses or breaches. For example, blockchains may store encrypted information and coded pointers to distributed storage locations that may be spread across distributed computer networks. Such a method may prevent those seeking to access or alter the information in an unauthorized manner from doing so by creating a highly distributed temporal infrastructure which may be impractical to reconstruct or, for example, impossible to reconstruct even if the unauthorized user is able to obtain a portion of the information associated with the blockchain.

In an embodiment of the present invention, the blockchain systems and methods described herein may be used within consensus engines, decentralized architectures and peer-to-peer clients, for example. Similarly, the blockchain systems and methods described herein may be used to facilitate secure communication within the Internet of Things, which may include devices subject to security breaches which arise from the vulnerabilities created by allowing unsecure and vulnerable data exchanges with a device and remote computing resources.

In an embodiment of the present invention, blockchain and AI processing may be used to provide, for example, robust validation techniques to prevent such things as Sybil attacks, for example, and dismiss masquerading hostile entities by providing a secure identity and/or authorization mechanism. For example, a local entity may accept a remote encrypted identity blockchain based on a central authority which may ensure a one-to-one correspondence between an identity and an entity and may even provide a reverse lookup. The identity may be validated either directly or indirectly. In direct validation the local entity queries the central authority to validate the remote identities. In indirect validation the local entity relies on already accepted identities which in turn vouch for the validity of the remote identity in question.

Figure 3:
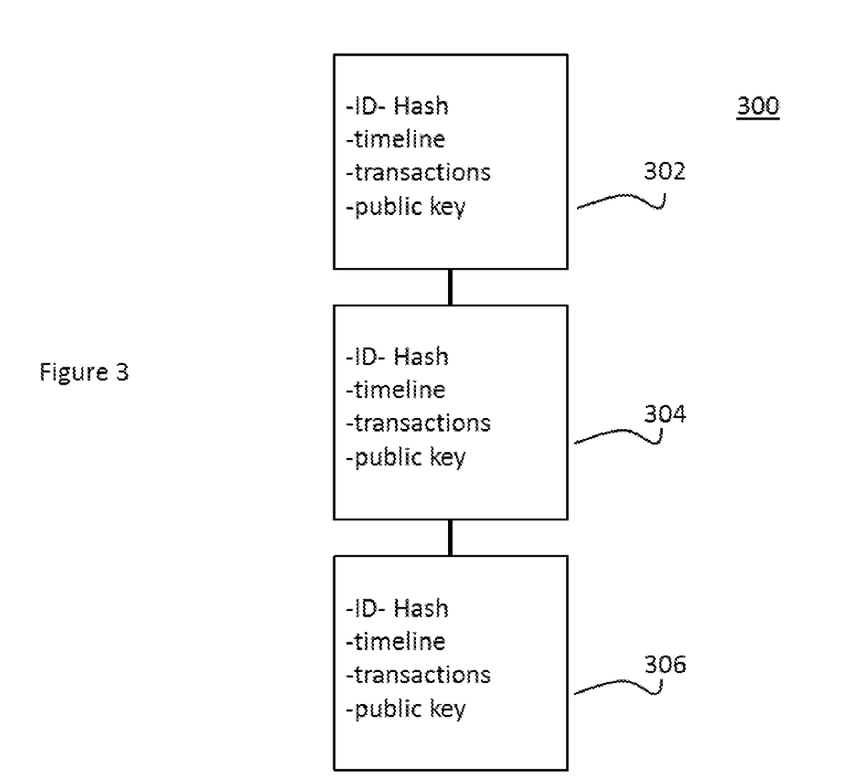
FIG. 3 is an illustration of a distributed ledger for use in the present invention.

As illustrated in FIG. 3, blockchain 300 is an illustrative example in accordance with at least one embodiment of the invention. Blockchain 300 illustrates a blockchain having 3 blocks, 302, 304, and 306. Block 302 is the first block and is therefore considered to be the genesis block. Each block may include certain information, such as an Identification, or hash, that uniquely identifies the block, a timeline identifying one or more previous blocks (e.g., the one or more hash numbers of previous blocks) in chronological order, transactions to record all transfers between a sender and a receiver, and a public key that identifies at least one sender and at least one receiver. Hash values may be combined into a Merkle tree. The linked blocks therefore form a chain where each link, or block, in the chain uniquely identifies one or more previous links, or blocks, by including the one or more hashes, prior links, or blocks.

Figure 4:
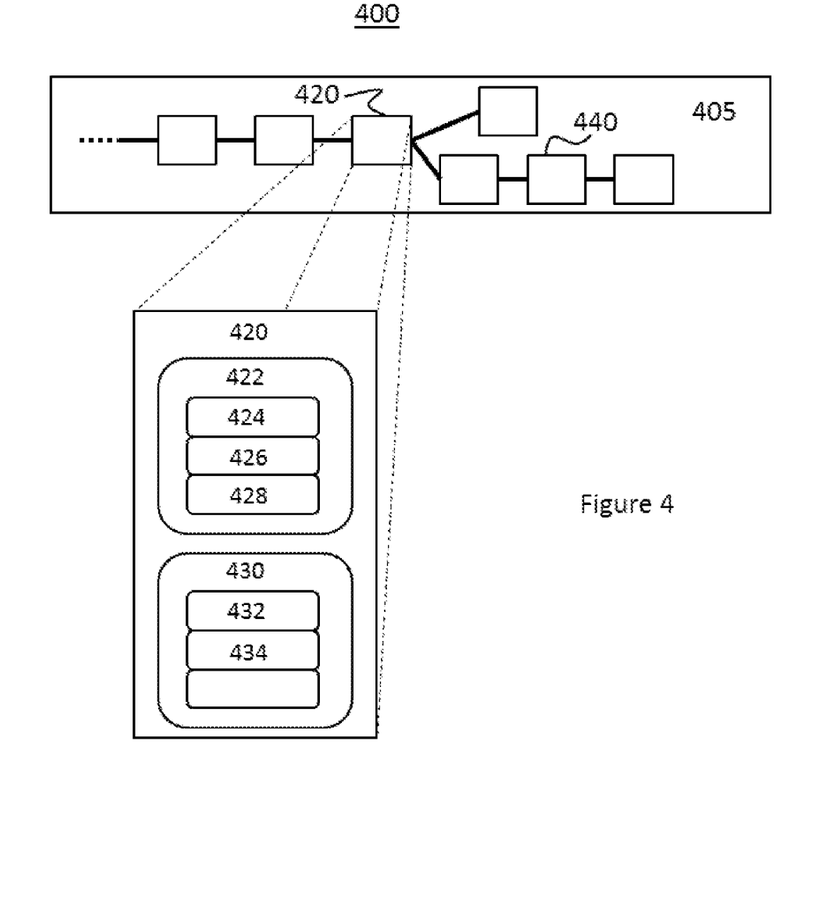
FIG. 4 is an illustration of a distributed ledger for use in the present invention.

In an embodiment of the present invention, a distributed secure transaction ledger, in the form of a block chain, may be used to communicate data between parties. As illustrated in FIG. 4, a block chain or decentralized secure transaction ledger 405 may be one that is maintained by nodes in a distributed network. Although each block of ledger 405 may contain differentiated information and may crave distinct purposes, as illustrated in FIG. 4, block 410 contains a sample communication or message according to embodiments of the present invention.

In an embodiment of the present invention, ledger 405 may be used to send messages between at least two users of a system through, for example, nodes in a network. By way of non-limiting example only, a message in block 420 of the ledger 405 may contain a header 422 and contents 430. The header 422 may comprises at least one block ID 424 for block 420, one or more block IDs 426 of one or more previous blocks, and a nonce value 428, an arbitrary number that may be used as a cryptographic hash function. These values and block information may be used in linking blocks together to form a chain.

The contents 430 may comprise one or more messages 432 and may also include other data 434. In an embodiment on the present invention, a message 432 may comprise a unique identifier of the owner/originator/sender of the message. This information may be used for one or more purposes, such as, for example, to identify the owner or sender to provide a way by which a third-party node or nodes that handle and or process the ledger 405. Additionally, the identifier of the owner/sender may be used or linked to an authentication module and/or server associated with using the block chain as a communication channel, or for other actions. Indeed, block 420 may include any number of identifiers which may for example, be used to indicate whether or not the ledger 405 should be directed to a different identifier than the originator of the message 432. As would be appreciated by those skilled in the art, message 432 may include data for processing, which may be obfuscated using, for example, homomorphy transformation.

In an embodiment of the present invention, ledger 440 may be used to send encrypted and secure messages between users through public systems, private/closed systems, or a combination thereof. Similar to the message(s) in block 420, the contents of ledger 440 may comprises one or more messages and may also comprise other encryption/authentication data. In an embodiment of the present invention, a message contained in ledger 440 may comprise a unique identifier of the recipient of the message, which may be the originator of the initial message or another entity. The message may include a unique identifier of the node that submitted the message. Such may be used for one or more purposes. For example, the identifier may help identify who sent the message. Additionally, the identifier may be used or linked to an authentication server/module associated with using the block chain as a communication channel, for performing security, authentication, resolving, or other actions.

In an embodiment of the present invention, the message 432 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

Figure 5:
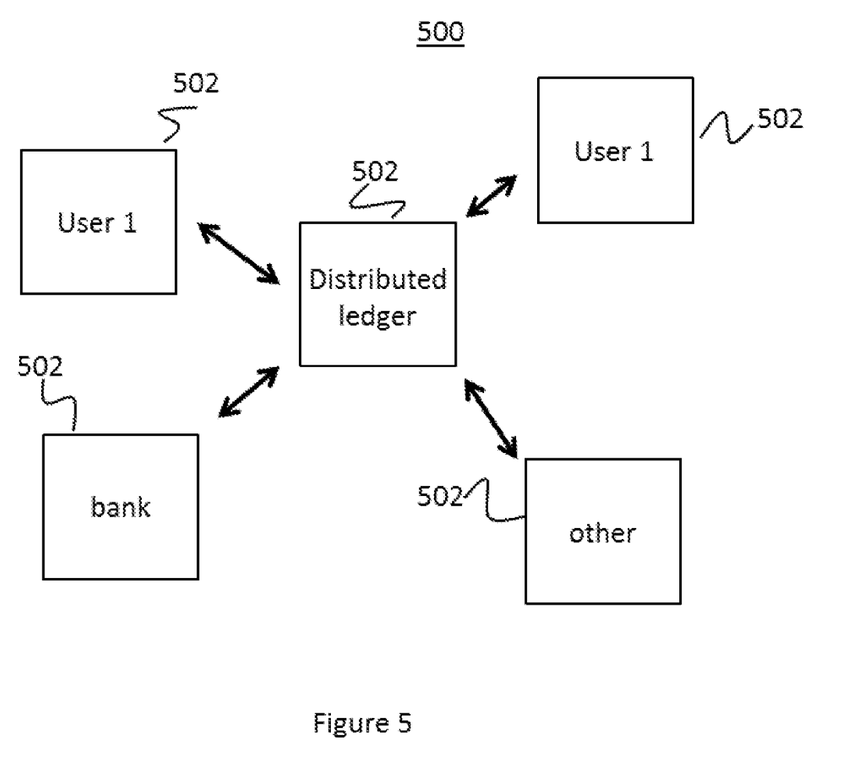
FIG. 5 is an illustration of a distributed ledger use environment.

FIG. 5 is a block diagram depicting an example blockchain environment 500, illustrating a simplified example of how a distributed ledger, or blockchain (such as blockchain 405) may be distributed, or replicated, on a network. Environment 500 may include a first user 502, a second user 504, another entity, such as a bank 508, and another third party entity 510 privy to the blockchain 506. The first/second user may be a buyer or seller, based on the transaction. Entities may include, but are not limited to, consumers, bankers, merchants, and investors. Blockchain 506 may be replicated in an agreed-upon manner or in real-time (e.g., after each transaction).

Figure 6:
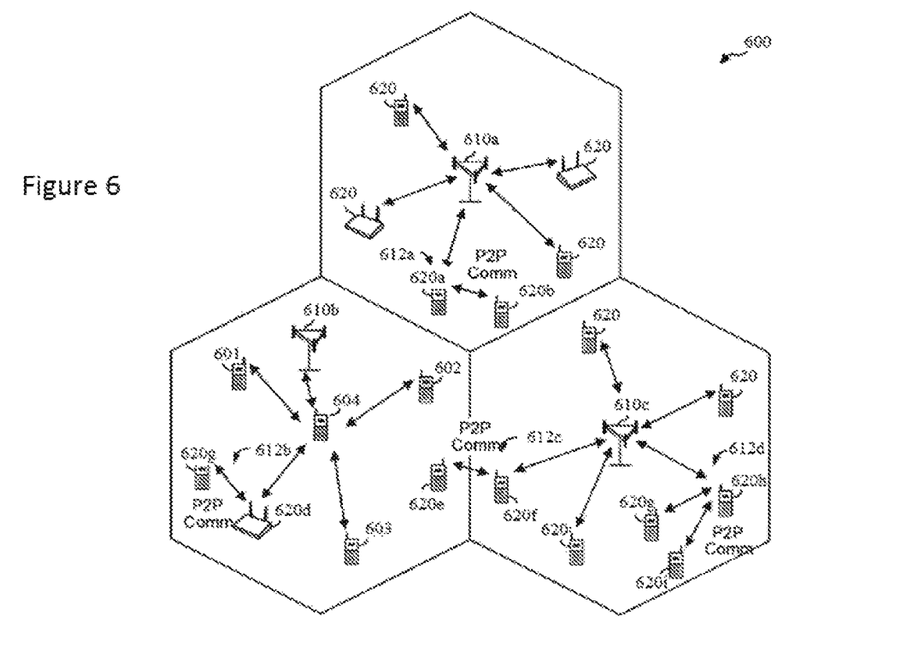
FIG. 6 is an illustration of an exemplary networked system environment for use in accordance with herein described systems and methods.

In an embodiment of the present invention, a distributed ledger may be used as a communication means in distributed communication system and remain secure. As illustrated in FIG. 6, a wireless network 600 may be used to interconnect nearby devices by employing widely used networking protocols, such as using the IEEE 802.11 wireless protocol family, for example.

In one aspect, wireless network 600 operating in infrastructure mode may comprise various devices $620x$, $620y$, $620z$ (which may be considered nodes), and an access point 602 serves a coverage area forming Wi-Fi cell $610a$. An access point, as used herein, is a station that supports communication for wireless devices associated with that access point. An access point may also be referred to as a base station. Each access point may be identified by an access point identity (APID), which may be a globally unique Medium Access Control (MAC) address (i.e., an address the provides a unique identifier in the MAC protocol layer) that is included in frames transmitted by the access point 602. For example, the MAC address may correspond to an Internet Protocol (IP) address, or the like. Access point 602 may directly or indirectly couple to a network server that may perform various functions. The network server may be a single network entity or a collection of network entities.

A wireless device, or "device," refers herein to a station that can communicate with another station via a wireless medium. A device may be stationary or mobile, and may also be referred to as a mobile station, a user equipment, a subscriber station, etc. A device may be a cellular phone, a personal digital assistant (PDA), a handheld device, a wireless device, a laptop computer, a wireless modem, a cordless phone, a telemetry device, a tracking device, etc. A device, and/or an access point, may also receive signals for satellites, which may be part of the United States Global Positioning System (GPS), the European Galileo system, the Russian Glonass system, or some other satellite Positioning System (SPS). A device may measure signals for access point 302, for other devices, and/or signals from the aforementioned satellites. The measurements may be used to determine the location and/or the connectivity of the device, the other devices, and/or the access points.

In the description herein, WLAN communication refers to communication between a device and an access point, i.e., communication in the aforementioned infrastructure mode, such as for a call between the device and a remote entity, such as another device, via the access point. A WLAN link, and variants thereof, as used herein, thus refers to a communication link between a device and an access point.

In contrast, in ad hoc mode, also referred to herein as peer-to-peer (P2P) mode, one of the devices may provide some or all of the communication and communication management responsibilities of the access point 602 and/or of the network server. Each of these points within the network may provide authentication and/or authorization keys and/or lookup tables to validate one or more messages of a ledger traveling in the communications network 600. Although a ledger may be verified at a specific time and or location, ledgers and the clocks therein may be subject to a periodic beaconing process, and the authentication of new blocks, by way of non-limiting example. Accordingly, by limiting the constancy of authentication, the location of such authentication and the timing of such authentication, for example, the system may allow for in more efficient and expedient encrypted communications utilizing distributed ledger authentication protocols. This may also allow P2P networks to more easily and securely connect mobile devices together when there is no operating or present access point.

Authentication techniques of distributed ledger based messages may incorporate keys and other known encryption aspects, but may also include real-time location information. For example, if you are messaging back and forth with a colleague who you expect to be in a certain location, the authentication means used in the present invention my include confirming that the communication received was sent from the location and at the time expected.

Technology for locating wireless devices (e.g., cell phones) with high accuracy began to be widely deployed in response to the United States Federal Communications Commission (FCC) Enhanced 9-1-1 Phase II mandate. Wireless location technologies include both network-based and handset based technologies. The network-based high accuracy technologies use the uplink (mobile-to-base station) radio signaling from the handset with Time-of-Arrival (TOA), Time-Difference-of-Arrival (TDOA), and/or Angie of Arrival (AoA) techniques to locate a mobile device. High accuracy location technologies may include the use of a timing beacon systems such as a Global Navigation Satellite System (GNSS), the prime example being the NAVSTAR Global Positioning System (GPS). Use of GNSS signals and signaling from the wireless communications network allow for Assisted GNSS (A-GNSS) which lowers the time needed to generate a position fix over conventional GPS and can increase receiver sensitivity.

Medium accuracy location technologies are sometimes used for localization of transmitters either as a fallback method or in conjunction with a high accuracy localization technique. These techniques include the network-based techniques of cell-ID localization and may include the addition of timing or power ranging Signal-Strength-Measurement (SSM) with calibrated RF fingerprinting (a pattern matching technique). The handset-based medium accuracy technologies include downlink radio signal techniques such as Enhanced Observed Time Difference (E-OTD), Advanced Forward Link Trilateration (AFLT), and Observed Time Difference of Arrival (OTDOA).

Hybridization of location technologies may also be used. Various combinations of U-TDOA, AoA, AFLT, A-GPS, TOA, SSM, and OTDOA have been successfully fielded while other combinations of the high or high/medium accuracy handset and network location techniques have been proposed.

Passive Location using network-used wireless location techniques relies on the monitoring of the radio air interface or WCN links and waiting for the mobile device to execute a network transaction either on the control channel or traffic channel. These network transactions include periodic re-registration, as well as ad hoc events such as call or data connection related events (initiation, termination, handover) and roaming events such as location updating.

Active Location using network-based wireless location techniques relies on cooperation or co-opting of the wireless location system. Cooperative arrangements include polling or auditing via system messaging examples of which include Identity Request, Any_Time_interrogation (ATI) (as part of the Mobile Terminated Location Request Procedure), Null SMS pinging or simply calling or messaging the mobile in question.

Each of the above discussed location technologies may provide information which may be written into a block in a distributed ledger which may subsequently be authenticated by a node in the communication system and/or by the receiver of the ledger.

Figure 7:
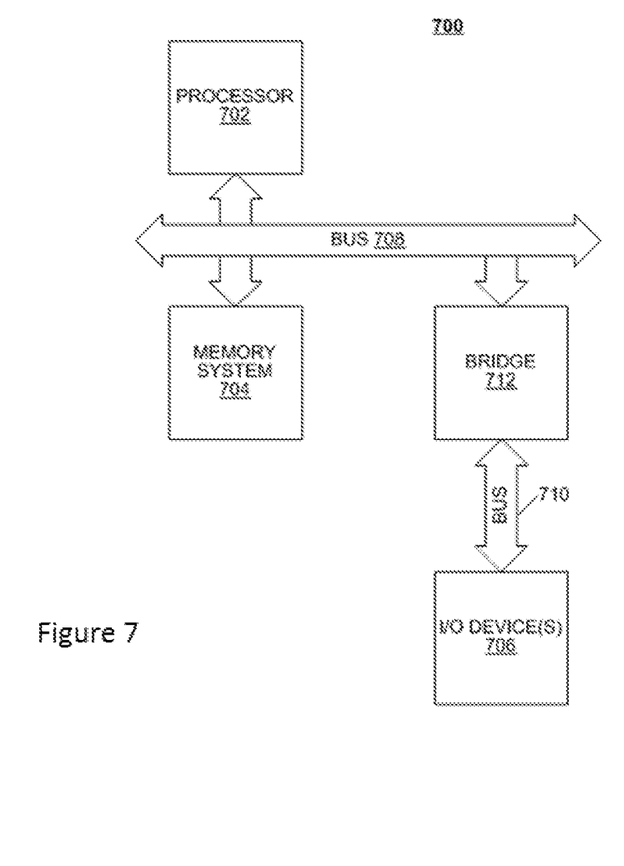
FIG. 7 is a block diagram showing an exemplary networked computing environment for use in accordance with herein described systems and methods.

FIG. 7 is an example of a simplified functional block diagram of a computer system 700. The functional descriptions of the present invention can be implemented in hardware, software or some combination thereof. For example, a recommendation engine and an integration engine of the present invention can be implemented using a computer system.

As shown in FIG. 7, the computer system 700 includes a processor 702, a memory system 704 and one or more input/output (I/O) devices 706 in communication by a communication 'fabric'. The communication fabric can be implemented in a variety of ways and may include one or more computer buses 708, 710 and/or bridge and/or router devices 712 as shown in FIG. 7. The I/O devices 706 can include network adapters and/or mass storage devices from which the computer system 700 can send and receive data for generating and transmitting advertisements with endorsements and associated news. The computer system 700 may be in communication with the Internet via the I/O devices 708.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

The various illustrative logics, logical blocks, modules, and engines, described in connection with the embodiments disclosed herein may be implemented or performed with a general purpose processor, a digital signal processor (DSP), air application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

The invention claimed is:

1. A method of providing secure communications within a network having a plurality of computing devices comprising:
   writing, by at least one of the plurality of computing devices, into a first block associated with a distributed ledger at least one first sequence of characters representative of a first message, and writing into the first block a unique first block identifier, first location information associated with the first message, and a unique first sender identifier, wherein the unique first sender identifier is linked to an authentication server, wherein the authentication server is associated with using distributed ledger data as a communication channel;
   writing, by at least one of the plurality of computing devices, into a second block associated with the distributed ledger a unique second block identifier and a second block timeline comprising the unique first block identifier, further writing into the second block at least one second sequence of characters representative of a second message, second location information associated with the second message, and a unique second sender identifier, wherein the unique second sender identifier is linked to the authentication server;
   writing, by at least one of the plurality of computing devices, into a third block associated with the distribution ledger a unique third block identifier and a third block timeline comprising the unique first block identifier and the unique second block identifier, further writing into the third block at least one third sequence of characters representative of a third message, third location information associated with the third message, and a unique third sender identifier, wherein the unique third sender identifier is linked to the authentication server;
   sending, by at least one of the plurality of computing devices, the distributed ledger to another one or more of the plurality of computing devices through the network;
   confirming, by at least one of the plurality of computing devices from the one or more of the plurality of computing devices receiving the distributed ledger, that at least one of the first location information, the second location information, or the third location information is an expected location;
   processing, by the authentication server, at least one of the unique first sender identifier, the unique second sender identifier, or the unique third sender identifier to authenticate the sender; and
   in response to confirmation of the location information and proper authentication of the sender, displaying at least one of the first message, the second message, the third message;
   wherein the unique first and second block identifiers are hash numbers, and wherein each of the first message, the second message, and the third message comprise data obfuscated using homomorphy transformation.

2. The method of claim 1, wherein the first block comprises a first header and a first nonce value that is a first arbitrary number used as a first cryptographic hash function, the second block comprises a second header and a second nonce value that is a second arbitrary number used as a second cryptographic hash function, and the third block comprises a third header and a third nonce value that is a third arbitrary number used as a third cryptographic hash function.

3. The method of claim 1, wherein sending comprises replicating the distributed ledger on the one or more computing devices in response to a block confirmation.

4. The method of claim 1, wherein one or more of the first message, the second message, and the third message are intended to be sent from at least one sender to at least one receiver.

5. The method of claim 4, wherein the at least one sender and the at least one receiver are each identified using a public key.

6. The method of claim 1, wherein the network comprises a wireless network.

7. The method of claim 1, wherein the distributed ledger is maintained by replicating the distributed ledger in response to consensus being reached between a subset of the plurality of computing devices.

* * * * *